(12) United States Patent
Ahmavaara

(10) Patent No.: US 7,058,423 B1
(45) Date of Patent: Jun. 6, 2006

(54) SERVICE MANAGEMENT

(75) Inventor: Kalle Ahmavaara, Espoo (FI)

(73) Assignee: Nokia Corporation, Espoo (FI)

( * ) Notice: Subject to any disclaimer, the term of this patent is extended or adjusted under 35 U.S.C. 154(b) by 382 days.

(21) Appl. No.: 10/019,745

(22) PCT Filed: Jun. 30, 2000

(86) PCT No.: PCT/IB00/00989

§ 371 (c)(1),
(2), (4) Date: May 9, 2002

(87) PCT Pub. No.: WO01/03454

PCT Pub. Date: Jan. 11, 2001

(30) Foreign Application Priority Data

Jun. 30, 1999 (GE) .................................. 9915301

(51) Int. Cl.
*H04M 1/00* (2006.01)
(52) U.S. Cl. .................. 455/552.1; 455/553.1
(58) Field of Classification Search ............. 455/552.1, 455/553.1
See application file for complete search history.

(56) References Cited

U.S. PATENT DOCUMENTS

| | | | | |
|---|---|---|---|---|
| 5,548,631 A | * | 8/1996 | Krebs et al. ............. | 455/426.1 |
| 6,223,030 B1 | * | 4/2001 | Van Den Heuvel et al. ..... | 455/435.2 |
| 6,801,786 B1 | * | 10/2004 | Korpela ................... | 455/552.1 |

FOREIGN PATENT DOCUMENTS

| | | |
|---|---|---|
| GB | 2294844 | 5/1996 |
| JP | 09-265696 | 9/1997 |
| JP | 10-154078 | 6/1998 |
| WO | 9837721 | 8/1998 |
| WO | 9837722 | 8/1998 |
| WO | 9931917 | 6/1999 |

OTHER PUBLICATIONS

"Architectural Aspects for the Evolution of Mobile Communications Toward UMTS", E. Berruto et al, *IEEE Journal on Selected Areas of Communications*, vol. 15, No. 8, Oct. 1997, pp. 1477-1486.

"GRAN'—A New Concept for Wireless Access in UMTS", A. Schieder et al, *XVI World Telecom Congress Proceedings*, Int'l Switching Symposium, Toronto Canada, Sep. 21, 1997. pp. 339-345.

* cited by examiner

*Primary Examiner*—Ahmad F. Matar
*Assistant Examiner*—Quynh H. Nguyen

(57) ABSTRACT

A method of establishing a connection in a telecommunications system in which an intermediate network provides for communications between a user terminal and one or more of a plurality of serving network entities each capable of providing communications services to the user terminal by means of at least one telecommunications protocol, the method comprising the step of the intermediate network transmitting to the user terminal an indication of the serving network entities and the communications services provided by each one.

34 Claims, 2 Drawing Sheets

SERVICE MANAGEMENT

This invention relates to managing services and overseeing mobility of a user in a telecommunication network. The invention is especially, but not exclusively, suitable for implementation in the proposed UMTS (Universal Mobile Telecommunications System) architecture.

FIG. 1 shows generally the architecture proposed for UMTS. A mobile station (MS) 1 can communicate by radio with one or more base stations (BS) 2. Each base station is linked by an Iub interface 3 to a single radio network controller (RNC) 4. Each RNC can be linked to one or more BSs. An RNC can be linked to another RNC by an Iur interface 5. Each RNC is linked by an Iu interface 6 to a core network (CN) 7. The CN includes one or more serving nodes that can provide communication services to a connected mobile station, for example a mobile switching centre (MSC) or a serving GPRS (general packet radio service) support node (SGSN) 8. These units are connected by the Iu interface to the RNCs. The CN is also connected to other telecommunications networks 9 such as fixed line networks or other mobile networks to allow onward connection of communications outside the UMTS network. The CN also includes other units such as a home location register (HLR) 10 and a visitor location register (VLR) 11 which help to control access to the network. The BSs and the RNCs and their interconnections constitute a UMTS terrestrial radio access network (UTRAN).

A mobile station can communicate with a core network via an RNC and a base station connected to that RNC. In soft handover (macrodiversity), the mobile station can send traffic communications via more than one base station. Those base stations may be connected to the same RNC or to different RNCs. If the base stations are connected to different RNCs then those RNCs communicate directly with each other via the Iur interface to co-ordinate their actions and to combine signals received from the mobile station. One of those RNCs is designated as the serving RNC and the others as drift RNCs. Communications between the user and the core network go via the serving RNC only. Thus, whether the mobile station is in soft handover or not its connection to the CN is through a single RNC. It can also arise in other circumstances than macrodiversity that a BS is controlled by a drift RNC, with communications going via serving a serving RNC to the core network.

In the core network each serving node such as an MSC or SGSN can provide a set of services to the mobile station. For example:

An MSC can provide circuit switched (CS) communications, for example for speech, fax or non-transparent data services, and therefore has a link to other entities in the circuit switched domain such as other CS mobile networks such as GSM (Global System for Mobile Communications) and CS fixed wire networks such as conventional voice telephony networks.

An SGSN can provide packet switched (PS) communications, for example for packet data protocol (PDP) contexts for internet protocol (IP) data transmission, and therefore has a link to other entities in the packet switched domain such as GPRS-equipped GSM networks and the internet.

The division of services between serving nodes is specified in the system specification and is strictly tied to the assumed network architecture. There may be other nodes than the MSC or SGSN providing overlapping or additional services.

It can be envisaged that in the future some services may be provided differently from the current arrangement. For example, speech services seem likely to migrate from the CS to the PS domain. In order to implement these changes to the network in the form described above is likely to cause substantial disruption. For example, to shift the provision of a fundamental service such as voice traffic to the PS domain may require routing hardware and software, as well as software in each mobile station, to be updated. This would cause great expense and inconvenience to network operators.

It would be desirable for there to be a way in which an operator can move a service previously executed by one type of network node to another type of network node with less disruption, or to introduce a new service via a new or an existing core network.

According to one aspect of the present invention there is provided a method of establishing a connection in a telecommunications system in which an intermediate network provides for communications between a user terminal and one or more of a plurality of serving network entities each capable of providing communications services to the user terminal by means of at least one telecommunications protocol, the method comprising the step of the intermediate network transmitting to the user terminal an indication of the serving network entities and the communications services provided by each one.

According to a second aspect of the present invention there is provided a telecommunications system comprising: a user terminal; a plurality of serving network entities each capable of providing communications services to the user terminal by means of at least one respective telecommunications protocol; an intermediate network providing for communications between a user terminal and one or more of the serving network entities, and being capable of transmitting to the user terminal an indication of the serving network entities and the communications services provided by each one.

Suitably, the user terminal selects the set of serving network entities which together support the set of services the user terminal wishes to use, and attaches to the serving network entities of the set.

Suitably the said indication is generated by the intermediate network. For this purpose the intermediate network may suitably store information defining the available serving network entities and the service(s) capable of being provided by each one, preferably together with an identifier for each network entity.

The said indication may be transmitted to the user terminal during and/or after establishment by the user terminal of a connection with the intermediate network. In the latter case, the indication may suitably be transmitted in response to a mobility event of the mobile terminal, for example during or generally in consequence of a procedure of the intermediate network consequent on reallocation of equipment in the intermediate network serving the connection with the user terminal. That event may be a serving radio network controller relocation in, for example, a UMTS system or the like.

The intermediate network is suitably capable of adjusting the number of paging areas according to the number of serving network entities, for example with one paging area for each serving network entity. Alternatively, all, or at least more than one, of the serving network entities may use a common paging area.

The intermediate network is suitably capable of constituting a communication path between the user terminal and one or more of the network entities. The user terminal and one or more of the network entities are preferably capable of communicating via the intermediate network.

There may be a plurality of mobile stations, which are preferably operable in similar manner, whereby each mobile station can individually establish or register for communications with one or more serving network entities.

Suitably, for the user terminal an instance of a management process is established for each serving network entity with which that terminal is registered for informing the respective serving network of changes in the connection path to the respective terminal through the intermediate network. The said instance may be run on processing apparatus local to the user terminal. On a change in the connection path to the mobile station through the intermediate network, each serving network entity may be informed of the change by means of the respective instance.

Suitably the intermediate network is capable of transmitting to a mobile station an indication of one or a plurality of serving network entities and the communications services provided by each one. Preferably, in order to receive a desired service a mobile station is capable of determining one of the serving network entities indicated as providing that service and attempting to establish a connection with that serving network entity via the intermediate network. Preferably, in consequence of the said indication of serving network entities and the communications services provided by each one, the system (most preferably the terminal) is capable of establishing a further instance of the management process for informing a respective serving network entity of changes in the connection path to a the said mobile station through the intermediate network. Alternatively, when a list of services is communicated to a terminal the terminal may already know which services are related to which serving nodes and consecutive to which management process. In that case if later the terminal needs to initialise a communication for a specific service then it may already be aware of which serving node it should contact, and thus suitably of which management process a request for such initialisation may be related to. In consequence of the said indication of serving network entities and the communications services provided by each one the system may suitably be capable of terminating an instance of the management process for informing a respective serving network entity of changes in the connection path to the said mobile station through the intermediate network.

The management process may be a mobility management process, suitably operable in accordance with a mobility management protocol, suitably a mobility management protocol of or for the Universal Mobile Telecommunications System or a derivative thereof.

The service(s) related to such management processes may, for example, be call control entities, session management entities, PDP (packet data protocol) entities, SMS (short message service) handling entities, voice-over-IP (internet protocol) entities, H.323 or H.324 entities, or supplementary service instances.

Some preferred features of all aspects of the invention will now be set out.

Suitably the user terminal is capable of communicating by radio and/or another medium with the intermediate network. The user terminal may be a unit that can be termed a mobile station, whether it is in fact mobile or immobile. The user terminal may be a mobile telephone.

The intermediate network is suitably operable according to the Universal Mobile Telecommunications System or a derivative thereof.

The intermediate network may be a radio access network, and is preferably a Universal Mobile Telecommunications System radio access network. The intermediate network is suitably capable of routing signals between the user terminal and one of the serving network entities, for example on the basis of (or in dependence on) a core network domain indicator. The intermediate network may include a Universal Mobile Telecommunications System radio network controller capable of performing the said routing.

Suitably at least one of the serving network entities is capable of providing for communications between the intermediate network and another telecommunications network. Each serving network entity may be a core network. Each serving network entity may include a home location register and/or a visitor location register. Suitably one or more of the serving network entities is capable of providing for circuit switched communications between the intermediate network and another telecommunications network. Suitably one or more of the serving network entities is capable of providing for packet switched communications between the intermediate network and another telecommunications network.

The or each serving network entity may suitably but not necessarily be a serving network domain or serving network element.

The present invention will now be described by way of example with reference to the accompanying drawings, in which.

Figure 2:
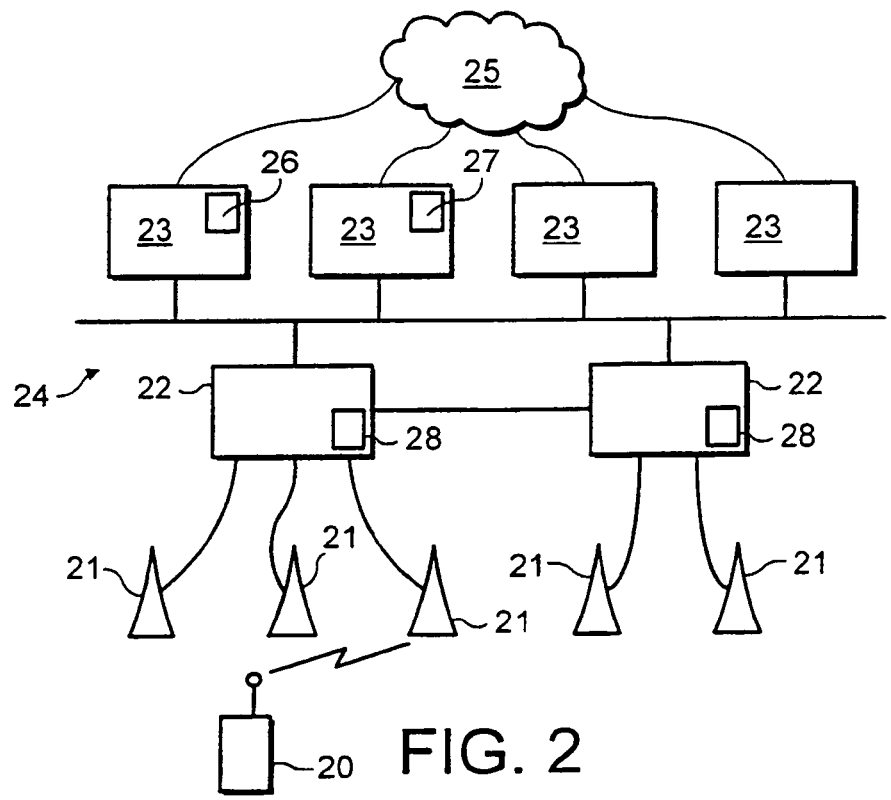
FIG. 2 is a schematic diagram of a modified architecture for a UMTS telecommunications system.

The network shown in FIG. 2 is arranged so that instead of services being offered to a mobile station by a set of rigidly configured core network nodes, services can be offered to the user by a set of logical CN nodes. The services offered by each logical CN node can be reconfigured in a relatively straightforward manner. Furthermore, it is relatively easy to add additional CN nodes to introduce new services.

Figure 1:
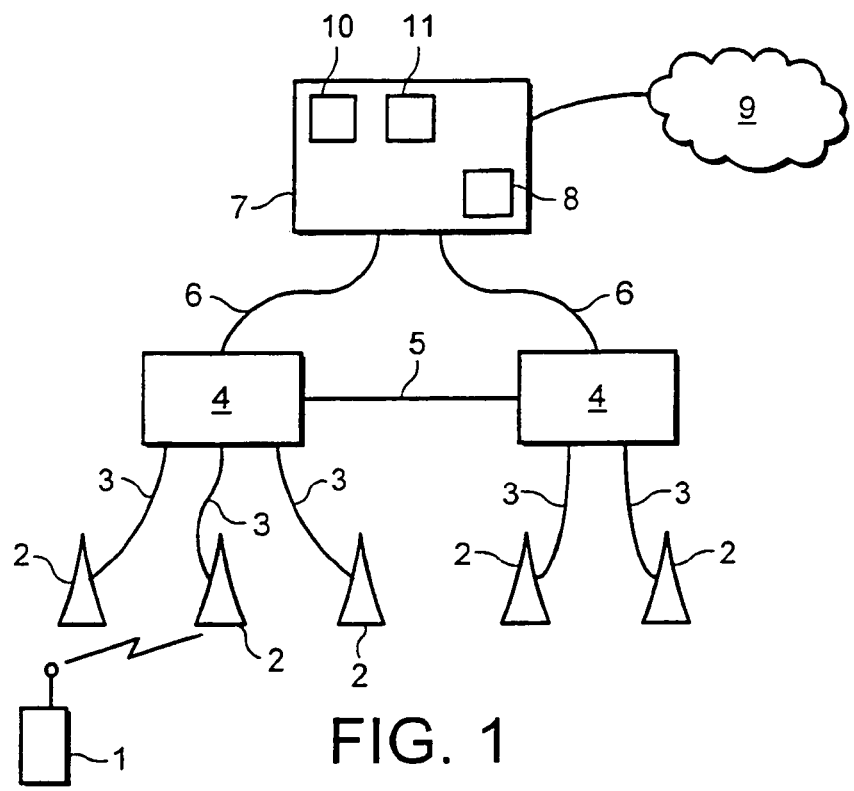
FIG. 1 is a schematic diagram of the currently-proposed architecture for a UMTS telecommunications system.

The network of FIG. 2 includes a mobile station 20, base stations 21 and RNCs 22. The interconnection of these units and the general aspects of their operation are suitably as for the UMTS system of FIG. 1.

The network of FIG. 2 also includes a plurality of core network entities 23 any of which may communicate with any of the RNCs 22 via a distributed communication arrangement 24. The core networks 23 can communicate with external telecommunications networks 25 such as other mobile networks, the internet and fixed line networks, depending on the capabilities of the respective core network. For example, a core network may include a mobile switching centre (MSC) 26 for communications via voice or fax protocols or a serving GPRS (general packet radio service) support node (SGSN) 27 for data protocol communications. In a large network not all of the core networks 25 may be able to communicate with all of the RNCs 22, for geographical network configuration reasons.

The RNCs 22 include processing apparatus 28 for processing communications through the RNCs, handling control of the base stations 21 (e.g. controlling handovers), managing access of mobile stations into the system, managing mobility (e.g. location management or radio resource management) of mobile stations in the system between base stations, and other functions.

When a mobile station makes contact with the network it makes radio communication with a base station and thereby establishes an RRC (radio resource control) connection with the RNC to which that base station is connected. In the course of setting up that connection the UTRAN indicates to the mobile station the available CN nodes (domains) offering services within the service area controlled by the respective RNC. For each domain the UTRAN indicates to the MS the service(s) offered by that domain, together with an identifier for the domain, suitably a logical identifier such as a core network access number that may be used by the mobile station or other network entities to identify that core network in communications and allow routing to that network.

The MS is aware of which services it supports and for which of those services it requires a connection to the network. The MS can therefore select one or more appropriate CN domains for providing the required service(s). The MS attempts to connect to each selected domain so that it can be provided with a desired service from that domain.

For example, if the MS connects to the network requiring a circuit switched fax connection and a packet switched voice connection, the MS receives from the UTRAN a message indicating the available domains and the services offered/supported by each. The MS then selects one CN domain that is offering a fax service and one CN domain that is offering a packet switched service capable of carrying voice traffic. The MS then attempts to make a connection to each one of those domains. The domains may be the same or different.

Figure 3:
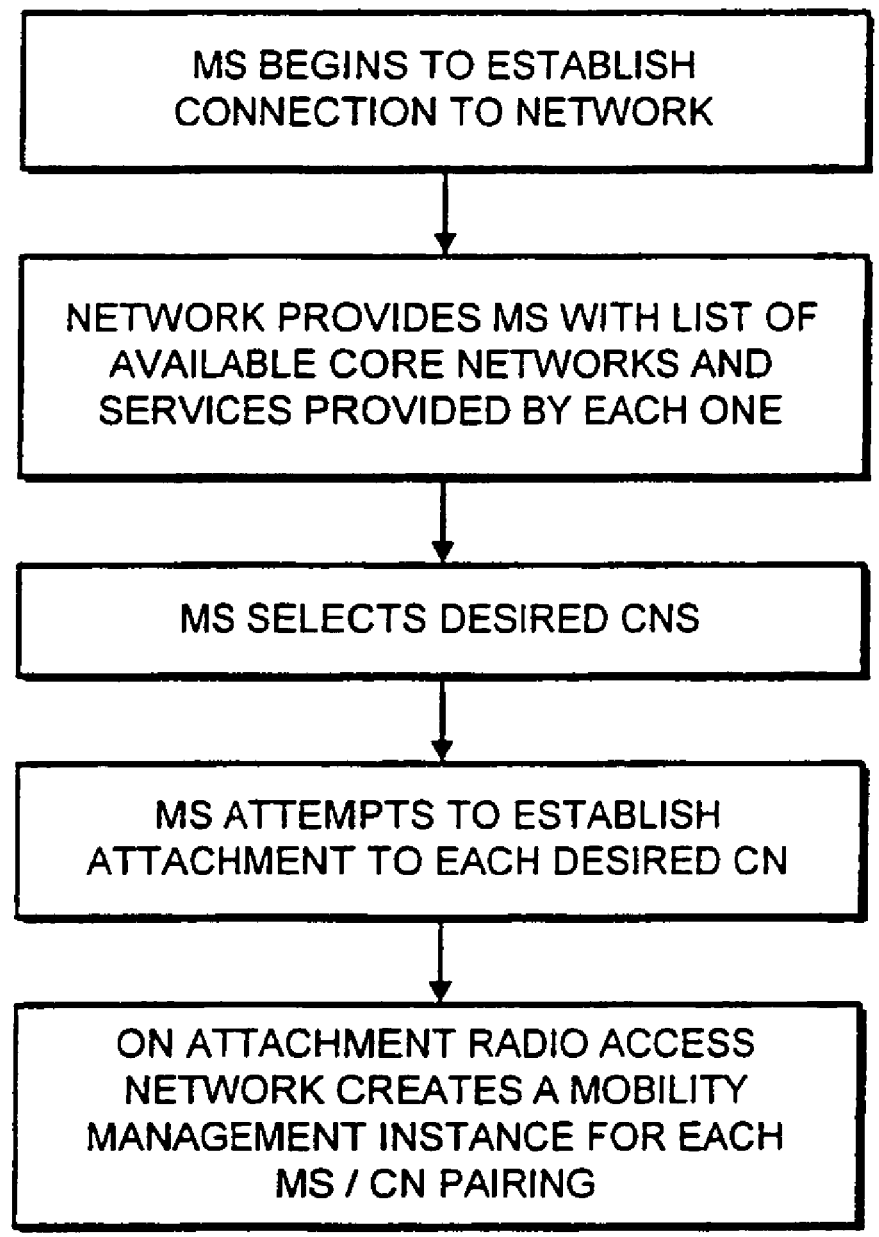
FIG. 3 is a flow diagram illustrating the operation of a method in the system of FIG. 2.

The process is illustrated generally in FIG. 3.

The said core network access number can simply be an identifier that is generated by the RNC for use in its communications with the MS. The MS can use the core network access number to indicate to the RNC which core network it wishes to access but the subsequent forwarding of an access request message on to the relevant core network may be done by the RNC using a different, true identifier that is unknown to the MS. Thus, from the point of view of the MS the RNC transparently passes its communications on to the relevant core network. Once a core network accepts and establishes an attachment to an MS the MS can be informed of a true identifier for the core network to allow it to direct communications to the core network via another RNC if necessary. The RNC preferably has logic to allow it to direct communications to a suitable CN serving entity of the desired domain—for example randomly, on the basis of information determined by the RNC, on the basis of information given to the RNC by one or more of the serving node (e.g. their loads) or on the basis of information given to the RNC by the user equipment (UE) (e.g. the identity of the entity that previously handled the UE's communications and therefore may have some information on the UE). When such an entity has been selected the RNC may address that entity by the identifier of a specific entity given to the user equipment by the entity itself.

As the mobile station moves within the network the base station(s) and the RNC(s) serving it may change, as may the serving nodes in the core network. To cope with this the UMTS system provides for mobility management (MM) protocol instances which handle location updates within the network in idle mode. In connected mode (i.e. when an RRC connection exists between the mobile station and an RNC) handover procedures are used, in which a connection is switched from a former node to a new node; the same principle is used whether the changing node is the BS, RNC or serving CN. In the system of FIG. 2, on attaching to a domain a mobile station initiates a UMTS mobility management instance especially for that domain. Therefore, associated with each MS there is a MM instance for each CN domain to which that MS is attached. In principle each MM instance operates independently of the others, following the UTRAN paging area indication and making appropriate location updates to its respective CN domain. (In practice the MM instances may be somewhat linked by, for example, a common paging area). By this means, each CN domain to which the MS is attached can be kept independently updated of the mobile station's location so that it can route communications to the mobile station accordingly.

As the operator updates the network and offers different services through different CN domains this is handled automatically through by the connection arrangement described above. When the MS accesses the network, if the operator now offers a service through a different CN node than before the MS simply attaches to the new CN node that is indicated to the mobile as being capable of providing the desired service. Thus the above arrangement copes automatically with the addition of new CN domains to provide services and with adjustment of the functional split of services between CN domains.

The system is preferably also capable of accommodating changes in the attachment pattern of the MS even whilst it is connected to the network. If the mobile receives from the UTRAN a message indicating a change in the split of services between CN nodes that affects the services for which the mobile station is attached then it suitably changes its pattern of attachment to meet with the new split of services. To meet the new split of service any of the following changes may be made, as appropriate:

1. Changing the arrangement for provision of a service from one CN domain to which the MS is already attached to another CN domain to which the MS is already attached. In this case the existing MM instance for that CN domain can also be updated to reflect the change in services being accessed through the respective CN domain.
2. Dropping the attachment for provision of a service from one CN domain and establishing an attachment for provision of that service from another CN domain to which the MS was not previously attached. In this case the existing MM instance for the dropped CN domain can be terminated and a new MM instance established for the newly attached CN domain.

This capability offers great flexibility to operators in the provision of new services or the reconfiguration of a network to provide existing services through new nodes. In particular, as services migrate from the CS domain to the PS domain the above arrangement provides the capacity for relatively straightforward reconfiguration of MS to CN connections from nodes that formerly provided a service in the CS domain to nodes that provide an equivalent service in the PS domain.

If the mobile station is informed of the availability of a service that is unknown to the mobile station then it can suitably ignore the availability of that service. By this means the system described above may be used to assist in version management—that is to assist compatibility between older and newer equipment in the system. Thus older mobile stations that are not compatible with newer services can cope with indications of the availability of services with which they are not compatible.

The applicant draws attention to the fact that the present invention may include any feature or combination of features disclosed herein either implicitly or explicitly or any generalisation thereof, without limitation to the scope of any of the present claims. In view of the foregoing description it will be evident to a person skilled in the art that various modifications may be made within the scope of the invention.

The invention claimed is:

1. A method of establishing a connection in a telecommunications system in which an intermediate network provides for communications between a user terminal and one or more of a plurality of serving network entities each capable of providing communications services to the user terminal by means of at least one telecommunications protocol, the method comprising the steps of:
the intermediate network transmitting to the user terminal an indication of the communications services provided by each one of the serving network entities;
the user terminal selecting one or more of the communication services; and
establishing for each user terminal for each serving network entity with which that terminal is registered an instance of a management process for informing a respective serving network entity of changes in a connection path to a respective through the intermediate network,
whereby on a change in the connection path to the user terminal through the intermediate network, each serving network entity is informed of the change by means of the respective instance.

2. A method as claimed in claim 1, wherein in order to receive a desired set of services the user terminal determines a set of the serving network entities indicated as together providing that set of services and attempts to establish a connection with the serving network entities in the set via the intermediate network.

3. A method as claimed in claim 2, wherein the said indication is generated by the intermediate network.

4. A method as claimed in claim 1 wherein the user terminal is capable of communicating by radio with the intermediate network.

5. A method as claimed in claim 1 wherein the intermediate network is operable according to the universal mobile telecommunications system or a derivative thereof.

6. A method as claimed in claim 5, wherein the serving network entities are core networks.

7. A method as claimed in claim 1, wherein the intermediate network is a radio access network.

8. A method as claimed in claim 7, wherein the intermediate network is a universal mobile telecommunications system radio access network.

9. A method as claimed in claim 1, wherein said indication is transmitted to the user terminal during the establishment of a connection between the user terminal and the intermediate network.

10. A method as claimed in claim 1, wherein said indication is transmitted to the user terminal during establishment of a radio resource control connection between the user terminal and the intermediate network.

11. A method as claimed in claim 1, wherein said indication is transmitted to the user after establishment of the connection between the user terminal and the intermediate network.

12. A method as claimed in claim 1, wherein said indication is transmitted to the user terminal during a procedure of the intermediate network consequent on reallocation of equipment in the intermediate network serving the connection with the user terminal.

13. A method as claimed in claim 11, wherein said indication is transmitted to the user terminal in consequence of a serving radio network controller relocation.

14. A method as claimed in claim 1, wherein said indication is transmitted to the user terminal in consequence of a change in serving network entity.

15. A method as claimed in claim 1, wherein the intermediate network is capable of adjusting a number of paging areas according to a number of serving network entities.

16. A method as claimed in claim 1, wherein at least one of the serving network entities is capable of providing for communications between the terminal and another telecommunications network.

17. A method as claimed in claim 1, wherein at least one of the serving network entities is capable of providing for circuit switched communications between the terminal and another telecommunications network.

18. A method as claimed in claim 1, wherein at least one of the serving network entities is capable of providing for packet switched communications between the terminal and another telecommunications network.

19. A method as claimed in claim 1, wherein the intermediate network is capable of routing signals between the user terminal and one of the serving network entities.

20. A method as claimed in claim 19, wherein the intermediate network is capable of routing signals from the user terminal to a selected one of the serving network entities on the basis of a core network domain indicator.

21. A method as claimed in claim 19, wherein the intermediate network includes a universal mobile telecommunications system radio network controller capable of performing said routing.

22. A method as claimed in claim 1, comprising the step of, in consequence of said indication of serving network entities and the communications services provided by each one, establishing a further instance of the management process for informing a respective serving network entity of changes in the connection path to the user terminal through the intermediate network.

23. A method as claimed in claim 1, comprising the step of, in consequence of the said indication of serving network entities and the communications services provided by each one, terminating an instance of the management process for informing a respective serving network entity of changes in the connection path to the user terminal through the intermediate network.

24. A method as claimed in claim 22, comprising the step of, in consequence of said indication of serving network entities and the communications services provided by each one, modifying an instance of the management process for informing a respective serving network entity of changes in the connection path to the user terminal through the intermediate network.

25. A method as claimed in claim 1, wherein the management process is a mobility management process.

26. A method as claimed in claim 25, wherein the management process is operable in accordance with a mobility management protocol.

27. A telecommunications system comprising:
a user terminal;
one or more serving network entities each capable of providing communications services to the user terminal by means of at least one respective telecommunications protocol; and
an intermediate network providing for communications between the user terminal and one or more of the serving network entities, and capable of transmitting to the user terminal an indication of the serving network entities and the communications services provided by each one; and a processing apparatus capable of for each user terminal establishing for each serving network entity with which that terminal is registered an instance of a management process for informing a respective serving network of changes in a connection path to a respective user terminal through the intermediate network, whereby on a change in the connection path to the user terminal through the intermediate network, each serving network entity is informed of the change by means of the respective instance.

28. A method of establishing a connection in a telecommunications system in which an intermediate network provides for communications between a user terminal and one or more of a plurality of serving network entities each capable of providing communications services to the user terminal by means of at least one telecommunications protocol, the method comprising the step of the intermediate network transmitting to the user terminal an indication of the serving network entities and the communications services provided by each serving network entity, the user terminal selecting one or more of the communication services; and establishing for each user terminal for each serving network entity with which that terminal is registered an instance of a management process for informing a respective serving network entity of changes in a connection path to a respective through the intermediate network, whereby on a change in the connection path to the user terminal through the intermediate network, each serving network entity is informed of the change by means of the respective instance.

29. A method as claimed in claim 28, wherein the user terminal is a mobile phone.

30. A method as claimed in claim 28, wherein the serving network entities are logically defined in a manner that allows the number of logical serving network entities to differ from the number of physical network entities.

31. A network element for providing for communications between a user terminal and one or more of a plurality of serving network entities each capable of providing communications services to the user terminal by means of at least one telecommunications protocol, the network element being arranged to transmit to the user terminal an indication of the serving network entities and the communications services provided by each serving network entity, said network element comprising a processing apparatus capable of for each user terminal establishing for each serving network entity with which that terminal is registered an instance of a management process for informing a respective serving network of changes in a connection path to a respective user terminal through the intermediate network, whereby on a change in the connection path to the user terminal through the intermediate network, each serving network entity is informed of the change by means of the respective instance.

32. A network element as claimed in claim 31, wherein the network element is a radio network controller.

33. A method of establishing a connection in a telecommunications system in which a network element provides for communications between a user terminal and one or more of a plurality of serving network entities each capable of providing communications services to the user terminal by means of at least one telecommunications protocol, the method comprising the step of the network element transmitting to the user terminal an indication of the serving network entities and the communications services provided by each serving network entity, the user terminal selecting one or more of the communication services; and establishing for each user terminal for each serving network entity with that terminal is registered an instance of a management process for informing a respective serving network entity of changes in a connection path to a respective through the intermediate network, whereby on a change in the connection path to the user terminal through the intermediate network, each serving network entity is informed of the change by means of the respective instance.

34. A network element for providing for communications between a user terminal and one or more of a plurality of serving network entities each capable of providing communications services to the user terminal by means of at least one telecommunications protocol, the network element having means configured to transmit to the user terminal an indication of the serving network entities and the communications services provided by each serving network entity, said network element comprising a processing apparatus capable of for each user terminal establishing for each serving network entity with which that terminal is registered an instance of a management process for informing a respective serving network of changes in a connection path to a respective user terminal through the intermediate network, whereby on a change in the connection path to the user terminal through the intermediate network, each serving network entity is informed of the change by means of the respective instance.

\* \* \* \* \*

UNITED STATES PATENT AND TRADEMARK OFFICE
CERTIFICATE OF CORRECTION

PATENT NO. : 7,058,423 B1  
APPLICATION NO. : 10/019745  
DATED : June 6, 2006  
INVENTOR(S) : Ahmavaara It is certified that error appears in the above-identified patent and that said Letters Patent is hereby corrected as shown below:

In column 1, prior to line 3, please insert --BACKGROUND OF THE INVENTION 1. Technical Field--.

In column 1, prior to line 8, please insert --2. Discussion of Related Art--.

In column 2, prior to line 12, please insert --DISCLOSURE OF INVENTION--.

In column 4, prior to line 25, please insert --BRIEF DESCRIPTION OF THE DRAWING--.

In column 4, prior to line 34, please insert --BEST MODE FOR CARRYING OUT THE INVENTION--.

Signed and Sealed this

Tenth Day of October, 2006

JON W. DUDAS  
*Director of the United States Patent and Trademark Office*